(12) United States Patent
Qin (10) Patent No.: US 11,605,841 B2
(45) Date of Patent: Mar. 14, 2023

(54) BATTERY EQUALIZING APPARATUS AND METHOD, AND UNMANNED AERIAL VEHICLE

(71) Applicant: AUTEL ROBOTICS CO., LTD., Guangdong (CN)

(72) Inventor: Wei Qin, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 414 days.

(21) Appl. No.: 15/930,961

(22) Filed: May 13, 2020

(65) Prior Publication Data

US 2020/0343738 A1 Oct. 29, 2020

Related U.S. Application Data

(63) Continuation of application No. PCT/CN2018/099218, filed on Aug. 7, 2018.

(30) Foreign Application Priority Data

Nov. 13, 2017 (CN) .......................... 201711116462.X (51) Int. Cl.
*H01M 10/44* (2006.01)
*B64C 39/02* (2023.01)
(Continued)

(52) U.S. Cl.
CPC ......... *H01M 10/441* (2013.01); *B64C 39/024* (2013.01); *H01M 10/425* (2013.01);
(Continued)

(58) Field of Classification Search
CPC .................................................. H01M 10/441
(Continued)

(56) References Cited

U.S. PATENT DOCUMENTS

| 11,111,033 | B1 * | 9/2021 | Burks | .................. B64C 39/024 |
| 2006/0103350 | A1 * | 5/2006 | Lai | ........................ H02J 7/0016 |
| | | | | 320/141 |

(Continued)

FOREIGN PATENT DOCUMENTS

| CN | 102412601 A | 4/2012 |
| CN | 202840545 U | 3/2013 |

(Continued)

OTHER PUBLICATIONS

International Search Report dated Nov. 12, 2018; Application No. PCT/CN2018/099218.

*Primary Examiner* — Jerry D Robbins (57) ABSTRACT

The present invention provides a battery equalizing apparatus and method, and an unmanned aerial vehicle (UAV). The battery equalizing apparatus includes: a battery gauge configured to monitor battery level information of a battery in a static state, a battery equalizing circuit being disposed inside the battery gauge; and a microprocessor connected to a communication port of the battery gauge and configured to: acquire the battery level information monitored by the battery gauge, and calculate a pressure difference between cells of the battery in a static state according to the battery level information, and determine whether the pressure difference is greater than a pressure difference threshold; the microprocessor sending a trigger signal to the battery gauge through the communication port when the pressure difference is greater than the pressure difference threshold, to trigger the equalizing circuit of the battery gauge to equalize the battery. Through implementation of the present invention, a space of a circuit board may be saved by using an internally integrated equalization function of the battery gauge, facilitating miniaturization of the battery.

12 Claims, 3 Drawing Sheets

(51) Int. Cl.
*H01M 10/42* (2006.01)
*H02J 7/00* (2006.01)
(52) U.S. Cl.
CPC .......... *H02J 7/0016* (2013.01); *H02J 7/0019* (2013.01); *H02J 7/0048* (2020.01); *B64C 2201/042* (2013.01); *H01M 2010/4271* (2013.01)
(58) Field of Classification Search
USPC .......................................................... 244/53
See application file for complete search history.

(56) References Cited

U.S. PATENT DOCUMENTS

| | | | | |
|---|---|---|---|---|
| 2010/0001737 | A1* | 1/2010 | Kubo | H02J 7/0047 324/434 |
| 2010/0231166 | A1* | 9/2010 | Lee | H02J 7/0018 320/118 |
| 2013/0300371 | A1* | 11/2013 | Bills | H02J 7/0014 320/134 |
| 2014/0197682 | A1* | 7/2014 | Tabatowski-Bush | B60L 58/22 307/9.1 |

FOREIGN PATENT DOCUMENTS

| | | |
|---|---|---|
| CN | 105449295 A | 3/2016 |
| CN | 107994278 A | 5/2018 |
| CN | 207490058 U | 6/2018 |

\* cited by examiner

BATTERY EQUALIZING APPARATUS AND METHOD, AND UNMANNED AERIAL VEHICLE

This application is a continuation application of International Application No. PCT/CN2018/099218, filed on Aug. 7, 2018, which claims priority of Chinese Patent Application No. 201711116462.X, filed on Nov. 13, 2017, which is incorporated herein by reference in its entirely.

BACKGROUND

Technical Field

The present invention relates to the field of battery management technologies, and, in particular, to a battery equalizing apparatus and method, and an unmanned aerial vehicle.

Related Art

At present, as an unmanned aerial vehicle in an unmanned aerial vehicle market is increasingly miniaturized, a lithium battery supplying power to the unmanned aerial vehicle is also increasingly miniaturized. However, miniaturization inevitably brings a compact battery space, so that some unnecessary functions such as a passive equalizing circuit and an active equalizing circuit outside a chip that occupy a great space, need to be saved to leave a space during battery design. However, a plurality of strings of unmanned aerial vehicle batteries has high requirements for battery voltage consistency. An unequalised battery has a risk of an inaccurate battery level and a battery level jump, posing a potential safety hazard on aircraft flight.

At present, a battery equalizing method may be roughly divided into two types: active equalization and passive equalization.

Active equalization: a charger equalizes charging on each battery during charging of the battery. Because the active equalization requires that each cell leads an equalization line port out, an interface space is inevitably occupied in terms of a structural space, going against miniaturized design of the battery.

Passive equalization: adjusting a large equalizing current by using an external resistor to achieve a rapid equalization speed and an obvious effect, but requiring a greater power resistor to discharge the battery, inevitably occupying some circuit board space. Therefore, it is difficult to use the solution for some batteries with a compact space.

SUMMARY

A technical problem to be resolved in the present invention is to overcome a shortcoming that a battery equalizing circuit in the prior art occupies a considerable space, going against miniaturization of a battery. Therefore, a battery equalizing apparatus and method, and an unmanned aerial vehicle is provided.

In order to achieve the foregoing objective, an embodiment of the present invention provides a battery equalizing apparatus, including: a battery gauge configured to monitor battery level information of a battery in a static state, a battery equalizing circuit being disposed inside the battery gauge; a microprocessor connected to a communication port of the battery gauge and configured to acquire battery level information monitored by the battery gauge, and calculate a pressure difference between cells of the battery in a static state according to the battery level information, and determine whether the pressure difference is greater than a pressure difference threshold; the microprocessor sending a trigger signal to the battery gauge through the communication port when the pressure difference is greater than the pressure difference threshold, to trigger the equalizing circuit of the battery gauge to equalize the battery.

In an embodiment, the communication port of the battery gauge is set to a high level after the battery gauge receives the trigger signal, so that the equalizing circuit of the battery gauge equalizes the battery.

In an embodiment, the microprocessor is further configured to determine, during battery equalization, whether the pressure difference is less than the pressure difference threshold; the microprocessor controlling, when the pressure difference is less than the pressure difference threshold, the battery gauge to stop equalizing the battery.

In an embodiment, the microprocessor is further configured to determine, according to the battery level information of the battery, whether a remaining battery level of the battery is less than or equal to a first equalizing threshold; the microprocessor controlling, when the remaining battery level of the battery is less than or equal to the first equalization threshold, the battery gauge to skip equalizing the battery.

In an embodiment, the microprocessor is further configured to determine, according to the battery level information of the battery during battery equalization, whether the remaining battery level of the battery is less than or equal to a second equalizing threshold; the microprocessor controlling, when the remaining battery level of the battery is less than or equal to the second equalization threshold, the battery gauge to stop equalizing the battery; where the second equalization threshold is less than or equal to the first equalization threshold.

In an embodiment, the first equalizing threshold is 80% of the remaining battery level of the battery, and the second equalizing threshold is 70% of the remaining battery level of the battery.

In an embodiment, the battery equalizing circuit includes: a switch element, where an input of the switch element is connected to a positive electrode of the battery; and an output of the switch element is connected to a negative electrode of the battery, and a control terminal of the switch element is connected to the microprocessor.

In an embodiment, the battery equalizing circuit further includes: a resistor and capacitor, the resistor being connected between a positive electrode of the battery and an input of the switch element; one end of the capacitor is connected between the resistor and the input of the switch element, and the other end is grounded.

In order to achieve the foregoing objective, an embodiment of the present embodiment further provides a battery equalizing method, the method being applied to the foregoing battery equalizing apparatus and including: acquiring battery level information of the battery in a static state, calculating a pressure difference between the cells of the battery in a static state according to the battery level information, and determining whether the pressure difference is greater than the pressure difference threshold; and sending a trigger signal to the battery gauge through the communication port when the pressure difference is greater than the pressure difference threshold, to trigger the battery gauge to equalize the battery.

In an embodiment, the communication port of the battery gauge is set to a high level after the battery gauge receives the trigger signal, so that the equalizing circuit of the battery gauge equalizes the battery.

In an embodiment, the battery equalizing method further includes: determining, during battery equalization, whether the pressure difference is less than the pressure difference threshold; and controlling, when the pressure difference is less than the pressure difference threshold, the battery gauge to stop equalizing the battery.

In an embodiment, before the acquiring battery level information of the battery in a static state, the battery equalizing method further includes: enabling a static equalization function of the battery gauge.

In an embodiment, the battery equalizing method further includes: determining, according to the battery level information of the battery, whether a remaining battery level of the battery is less than or equal to a first equalization threshold; and controlling, when the remaining battery level of the battery is less than or equal to the first equalization threshold, the battery gauge to skip equalizing the battery.

In an embodiment, the battery equalizing method further includes: determining, according to the battery level information of the battery during battery equalization, whether the remaining battery level of the battery is less than or equal to a second equalization threshold; and controlling, when the remaining battery level of the battery is less than or equal to the second equalization threshold, the battery gauge to stop equalizing the battery; where the second equalization threshold is less than or equal to the first equalization threshold.

In an embodiment, the first equalizing threshold is 80% of the remaining battery level of the battery, and the second equalizing threshold is 70% of the remaining battery level of the battery.

In order to achieve the foregoing objective, an embodiment of the present invention further provides a non-transitory computer-readable storage medium that stores a computer instruction, when the computer instruction is executed by a processor, the foregoing battery equalizing method being implemented.

In order to achieve the foregoing objective, an embodiment of the present invention further provides an unmanned aerial vehicle including a battery, the battery being equalized in the foregoing battery equalizing method.

Technical solutions of the present invention are characterized with the following advantages:

Through implementation of the present invention, the battery is equalized by using an internally integrated equalization function of the battery gauge to save a space of a circuit board, facilitating miniaturization of the battery. What's more, when the pressure difference between the cells of the battery is greater than the pressure difference threshold, the trigger signal is sent to the battery gauge through the communication port to trigger the battery equalizing circuit of the battery gauge to equalize the battery. In this way, the battery gauge still equalizes the battery even if the battery performs no output (i.e., in a static state) until the battery equalization is completed, preventing the battery gauge from entering a sleep state before the equalization is completed and making full use of static time of the battery in exchange for battery equalization. Furthermore, because the microcontroller performs control, a degree and an effect of battery equalization may be artificially set, which is used flexibly and conveniently.

In a practical application, in a case that the space of the circuit board of an unmanned aerial vehicle and so on is compact, the battery equalizing apparatus according to the embodiment of the present invention is adopted to ensure implementation of battery equalization without an increase in volume of the battery.

BRIEF DESCRIPTION OF THE DRAWINGS

To describe the technical solutions in the detailed description of embodiments of the present invention or in the prior art more clearly, the following briefly describes the accompanying drawings required for describing the detailed description of embodiments or the prior art. Apparently, the accompanying drawings in the following description show some embodiments of the present invention, and those of ordinary skill in the art may still derive other drawings from these accompanying drawings without creative efforts.

DETAILED DESCRIPTION

The following clearly describes the technical solutions in the present disclosure with reference to the accompanying drawings. Apparently, the described embodiments are some rather than all of the embodiments of the present invention. All other embodiments obtained by a person of ordinary skill in the art based on the embodiments of the present invention without creative effects shall fall within the protection scope of the present invention.

In the description of the present invention, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components; or the connection may be a wireless connection or a wired connection. Persons of ordinary skill in the art may understand the specific meanings of the foregoing terms in present invention according to specific situations.

In addition, the technical features provided in different embodiments of the present invention to be described below may be combined with each other as long as no conflict occurs.

Embodiment 1

An embodiment of the present invention provides a battery equalizing apparatus. Battery equalization is to use power electronic technologies to keep voltage deviation of a lithium-ion single cell or battery pack (multi-cell battery)

within an expected range, thereby ensuring each single maintains a same state during normal use to prevent overcharge and over-discharge.

Figure 1:
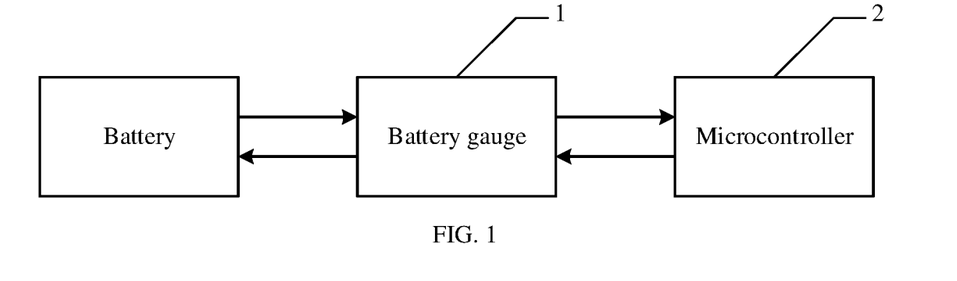
FIG. 1 is a schematic structural diagram of a specific example of a battery equalizing apparatus according to an embodiment of the present invention.

As shown in FIG. 1, the battery equalizing apparatus mainly includes: a battery gauge 1 and a microprocessor 2.

The battery gauge 1 is configured to monitor the battery level information of a battery in a static state. A battery equalizing circuit is designed in the battery gauge 1, so that the battery gauge 1 itself has a static equalization function. A communication port of the battery gauge 1 is connected to the microprocessor 2. A static state of the battery refers to a state of the battery without overcharge and over-discharge. It may be understood that the state without overcharge and over-discharge is not absolute, but refers to that the battery skips charging and discharging an external device. For example, the battery gauge and the microprocessor consume power of the battery itself with a very small discharge current. Therefore, the static state of the battery may be understood as a state in which a charge current or the discharge current of the battery is lower than a current threshold.

In one of embodiments, the battery includes a plurality of cells. In a practical application, each cell of the battery is connected to a pin of the battery gauge 1, and a communication port of the battery gauge 1 is connected to the microprocessor 2. Because the battery gauge 1 itself has a static equalization function, during specific implementation, the static equalization function of the battery gauge 1 is first enabled.

The microprocessor 2 acquires, through the communication port of the battery gauge 1, battery level information monitored by the battery gauge 1, calculates a pressure difference between cells of the battery in a static state according to the battery level information, and determines whether the pressure difference is greater than the pressure difference threshold (that a pressure difference between cells of the battery is calculated and the pressure difference between any two cells is greater than the pressure difference threshold means that battery equalization is required). If the pressure difference is greater than the pressure difference threshold, the microprocessor 2 sends a trigger signal to the battery gauge 1 through the communication port, pulls up the communication port of the battery gauge 1 (that is, controlling the communication port of the battery gauge 1 at a high level) to trigger the battery gauge 1 to equalize the battery.

Figure 2:
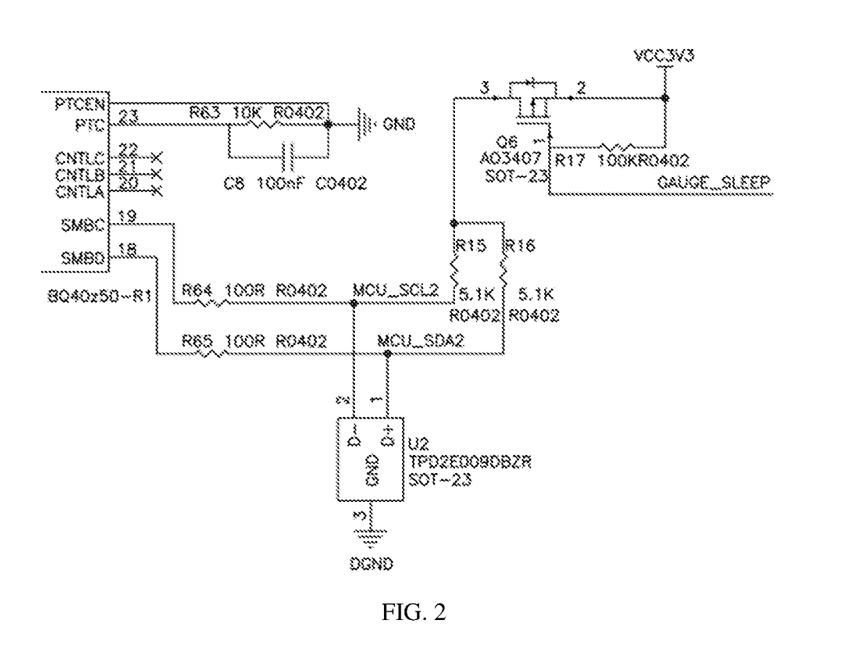
FIG. 2 is a schematic structural diagram of a specific example of a connection relationship between a microprocessor and a battery gauge according to an embodiment of the present invention.

In one embodiment, as shown in FIG. 2, the microprocessor 2 controls GAUGE_SLEEP to a low level, and then the switch element Q6 (in this embodiment, the switch element is an MOS tube, but the invention is not limited thereto) is turned on, and then a communication SMBC and SMBD of the battery gauge 1 is connected to a 3.3V high level. After the communication port of battery gauge 1 is pulled up, the battery starts to enter a static equalization mode. Therefore, the trigger signal refers to a control signal that controls GAUGE_SLEEP to a low level, and is used for triggering the communication port of the battery gauge 1 at a high level to equalize the battery.

In other embodiments, a low level may be further directly connected at a control terminal of the switch element, and the switch element is turned on when the low level is input in the control terminal of the switch element through a control signal of the battery gauge 1. It may be understood that the battery gauge 1 may be controlled in different ways after receiving the trigger signal provided that the communication port of the battery gauge 1 is set to a high level, so that the equalization circuit of the battery gauge 1 equalizes the battery.

In the battery equalizing apparatus of the embodiment of the present invention, the microprocessor 2 controls the battery gauge 1, and equalizes a voltage in an internal passive equalizing method of the chip, making full use of the static time of the battery in exchange for voltage equalization of the cell. In addition, because the microprocessor 2 performs control, an equalization degree and equalization effect may be set, so that the battery equalizing apparatus is used flexibly and conveniently. In a practical application, in a case that a battery of an unmanned aerial vehicle has a compact space, such equalization solution is an ideal solution, skillfully achieving consistent voltage equalization, and preventing a compact space caused by miniaturization.

In one embodiment, before battery equalization, the microprocessor 2 further determines, according to battery level information, whether a remaining battery level of the battery is less than or equal to the first equalization threshold. When the remaining battery level of the battery reaches the first equalization threshold, the microprocessor 2 controls the battery gauge 1 to skip equalization regardless of whether a pressure difference of the battery is greater than the pressure difference threshold. Because equalization of the battery in a static state is actually a power consumption process of the cell with a relative high voltage of the battery. Equalization when the remaining battery level of the battery is less than or equal to the first equalization threshold may possibly cause an equalization failure by the battery gauge before completion of the equalization.

In one embodiment, when the microprocessor 2 controls the battery gauge 1 to perform battery equalization, the microprocessor 2 determines whether the pressure difference between cells of the battery is less than the pressure difference threshold. When the pressure difference is less than the pressure difference threshold, it indicates that the pressure difference between the cells of the battery is kept in an expected range. In this case, the microcontroller 2 controls the battery gauge 1 to stop equalizing the battery.

It may be understood that, in other embodiments, the microcontroller 2 calculates a difference value between the pressure difference and the pressure difference threshold in an initial stage of battery equalization by the battery gauge 1. The microcontroller 2 may automatically control, at an end of the battery equalization, the battery gauge 1 to stop equalizing the battery, so that it is not necessary to determine, during the battery equalization, whether the pressure difference is less than the pressure difference threshold. For example, when the microcontroller 2 calculates, in an initial stage of control of battery equalization by the battery gauge 1, the difference value between the pressure difference and the pressure difference threshold is 0.5 V, after a cell with a relatively high voltage in the battery consumes 0.5 V power (that is, battery equalization is completed), the microcontroller 2 automatically controls the battery gauge 1 to stop equalizing the battery.

Further, during battery equalization, the microcontroller 2 determines, according to the battery level information of the battery, whether the remaining battery level of the battery is less than or equal to a second equalization threshold. When the remaining battery level of the battery is less than or equal to the second equalization threshold, the microcontroller 2 controls the battery gauge 1 to stop equalization. The second equalization threshold is greater than a minimum limit value for the equalizing circuit of the battery gauge 1 to work. When the remaining battery level of the battery is less than or equal to the second equalization threshold, the equalizing circuit cannot continue equalizing the battery due to a very low battery level.

In a practical application, the first equalization threshold is used for limiting a minimum value that the remaining battery level of the battery is required to reach before battery equalization. The second equalization threshold is mainly set according to a limit of a hardware circuit. In other words, the second equalization threshold is used for limiting a minimum value that the remaining battery level of the battery is allowed to reach during battery equalization. In addition, the second equalization threshold is less than the first equalization threshold. For example, if the second equalization threshold is set to 70% of the remaining battery level of the battery, and the first equalization threshold is set to 60% of the remaining battery level of the battery, the battery gauge 1 stops equalization when the remaining battery level of the battery reaches 70%. In this case, the first equalization threshold is still not reached, so that an equalization failure is caused all the time. Therefore, if the second equalization threshold is set to 70% of the remaining battery level of the battery, the first equalization threshold is higher than 70%, for example, 80%, so as to prevent the equalization failure all the time. Generally, an allowable limit of the hardware circuit is about 60% of the remaining battery level of the battery. In order to prevent a limit value of the hardware circuit, the second equalization threshold is generally set to be greater than 60%.

Figure 3:
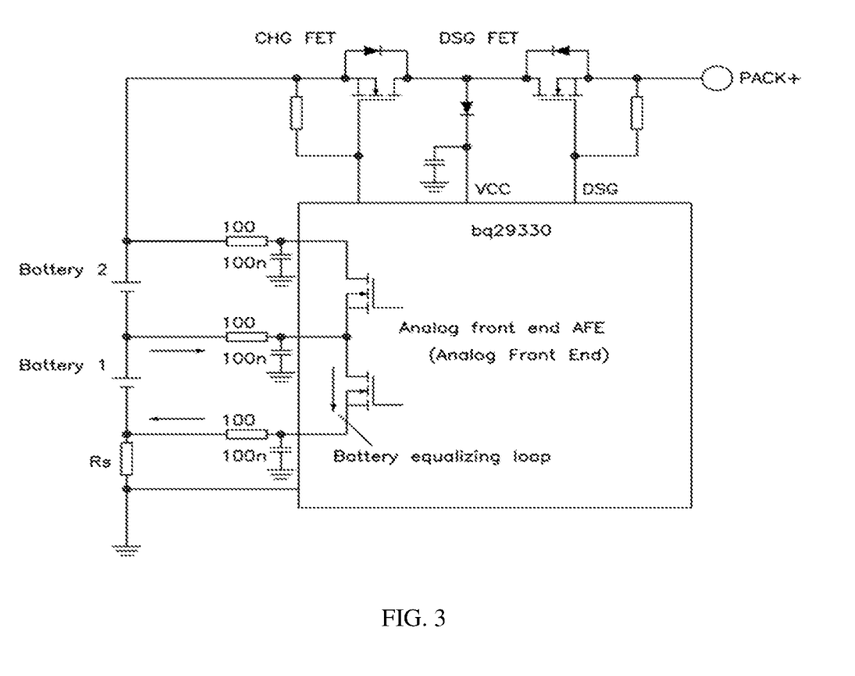
FIG. 3 is a schematic diagram of a battery equalizing circuit inside a battery gauge according to an embodiment of the present invention.

In one of the embodiments, the second equalization threshold and the first equalization threshold cannot be set too small, and is greater than a preset percentage value. As shown in FIG. 3, because an equalization switch element inside a chip uses an NMOS, a Vgs voltage of about 1.5V is required to open an MOS, and because an equalizing loop is connected in series with two 100R resistors, if a voltage of a cell is not high enough, the MOS may not be opened, so that voltage equalization cannot be performed.

In this embodiment, a microprocessor 2 is sending a trigger signal to a battery gauge 1 before the equalization is completed. When it is necessary to control the battery gauge 1 to stop equalization, sending of the trigger signal to the battery gauge 1 is stop. It may be understood that in other embodiments, the microprocessor 2 only needs to send a trigger signal to the battery gauge 1 once, so that the battery gauge 1 starts to equalize the battery until the microcontroller 2 sends a stop signal to the battery gauge 1 to control the battery gauge 1 to stop equalizing the battery.

In a practical application, although a battery equalizing circuit is set inside the battery gauge 1 to implement static equalization, if a communication port is not pulled up or the battery fails to perform output, the battery gauge 1 automatically enters a sleep state after a small period of time. Equalization is stopped in the state. Therefore, in order to prevent the battery gauge 1 from entering the sleep state before the equalization is completed, the microprocessor 2 needs to send a trigger signal to the battery gauge 1 to control the communication port of the battery gauge 1 at a high level until the equalization is completed.

In one of the embodiments, as shown in FIG. 3, the battery equalizing circuit inside the battery gauge 1 of the embodiment of the present invention mainly achieves battery equalization by providing switch elements corresponding to the batteries. An input of the switch element is connected to a positive electrode of the battery. An output of the switch element is connected to a negative electrode of the battery. A control terminal of the switch element is connected to the microprocessor 2. In one of the embodiments, the switch element may be an MOS tube, and specifically an NMOS tube, but the present invention is not limited thereto. In other embodiments, the switch element may be any element by adopting a switching function, such as a PMOS tube, a triode, etc.

Further, the battery equalizing circuit further includes: a resistor and capacitor, the resistor being connected between a positive electrode of the battery and an input of the switch element; one end of the capacitor being connected between the resistor and the input of the switch element, and the other end being grounded.

In one of the embodiments, because internal equalization of chip of the battery gauge 1 is performed, a current for equalization is small, and a long time is required (a 4300 mAH cell equalizes a 50 mV voltage difference for about 20 hours in an actual test), and therefore when the static equalization is performed on the battery, an indicator light and an output may not be turned on, so that an illusion of continuous power consumption is not caused to a user. In addition, preferably, a prompt apparatus (for example, a display screen for display or a loudspeaker for voice prompt, etc.) may be disposed. When the microprocessor 2 triggers the battery gauge 1 to perform battery equalization, prompt is performed by the prompt device to prompt the user. After a prompt is received, it indicates that the battery has a pressure difference, and a battery equalization operation is started. In this case, equalization is performed in a static manner.

For the battery equalization apparatus according to the embodiment of the present invention, an internally integrated equalization function of the battery gauge 1 is used for saving a space of a circuit board, facilitating miniaturization of the battery. In addition, in a practical application, in a case that the space of the circuit board of an unmanned aerial vehicle and so on is compact, the battery equalizing apparatus according to the embodiment of the present invention is adopted to ensure implementation of battery equalization without an increase in a volume of the battery. What's more, when the pressure difference between cells of the battery in a static state is greater than the pressure difference threshold, the microprocessor 2 sends the trigger signal to the battery gauge 1 through the communication port to trigger the battery equalizing circuit of the battery gauge 1 to equalize the battery. In this way, the battery gauge 1 still equalizes the battery even if the battery performs no output (i.e., in a static state) until the battery equalization is completed, preventing the battery gauge 1 from entering the sleep state before the equalization is completed and making full use of static time of the battery in exchange for battery equalization. Furthermore, because the microcontroller 2 performs control, a degree and an effect of battery equalization may be artificially set, so that the battery equalizing apparatus is used flexibly and conveniently.

Embodiment 2

Figure 4:
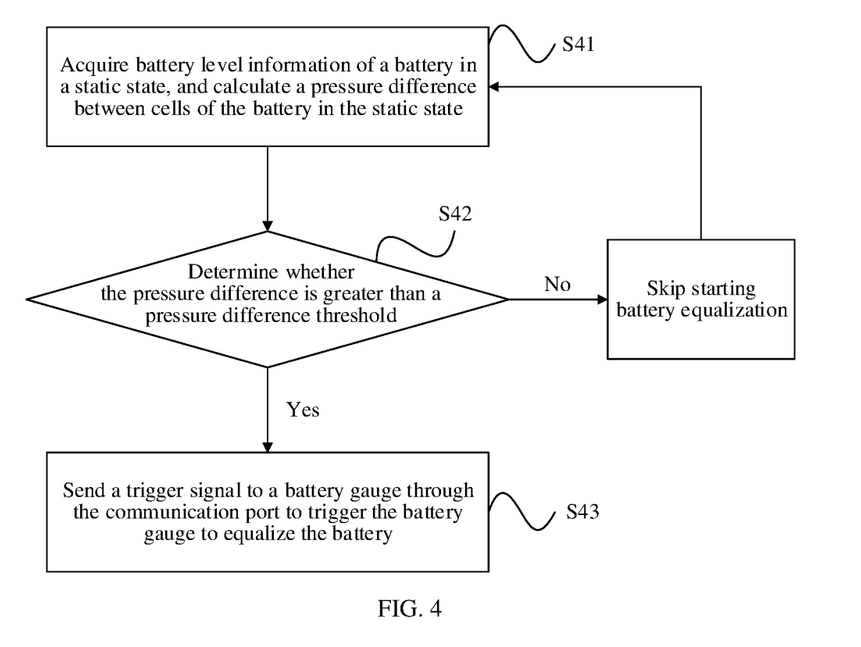
FIG. 4 is a flowchart of a specific example of a battery equalizing method according to an embodiment of the present invention.

An embodiment of the present embodiment provides a battery equalizing method. As shown in FIG. 4, the battery equalizing method mainly includes the following steps.

Step S41: Acquire battery level information of a battery in a static state, and calculating a pressure difference between cells of the battery in a static state.

In particular, each cell of the battery is connected to a pin of a battery gauge. Battery level information of the battery in a static state may be monitored in real time through a battery gauge and sent to a microprocessor. The microprocessor may calculate the pressure difference between the cells of the battery in a static state according to the battery level information In one embodiment, before step S41, the method further includes: enabling a static equalization function of the battery gauge. The battery gauge has a static equalization function of the battery, and the function needs to be enabled before use.

Step S42: Determine whether the pressure difference is greater than a pressure difference threshold.

In one embodiment, the microprocessor stores a default or artificially set pressure difference threshold. After the pressure difference between the cells of the battery in the static state is calculated, the pressure difference between the cells of the battery is compared with the pressure difference threshold, and it is determined whether the pressure difference is greater than the pressure difference threshold.

Step S43: When the pressure difference is greater than the pressure difference threshold, the microprocessor sends a trigger signal to a battery gauge through a communication port of the battery gauge, pulls up the communication port of the battery gauge (that is, controlling the communication port of the batter gauge at a high level), and triggers the battery gauge to equalize the battery.

If the pressure difference is not greater than the pressure difference threshold, battery equalization is not started, and the microprocessor returns to continue performing step S41: acquire battery level information of a battery in a static state, calculate the pressure difference between the cells of the battery in the static state, perform step S42: determine whether the pressure difference is greater than the pressure difference threshold, and when the pressure difference is greater than the pressure difference threshold, perform step S43: the microprocessor sends a trigger signal to a battery gauge through a communication port of the battery gauge to trigger the battery gauge to equalize the battery.

In one embodiment, before battery equalization, the microprocessor further determines, according to battery level information of the battery, whether a remaining battery level of the battery is less than or equal to the first equalization threshold. When the remaining battery level of the battery reaches the first equalization threshold, the microprocessor controls the battery gauge to skip equalization regardless of whether a pressure difference of the battery is greater than the pressure difference threshold. Because equalization of the battery in a static state is actually a power consumption process of the cell with a relative high voltage of the battery. Equalization when the remaining battery level of the battery is less than or equal to the first equalization threshold may possibly cause an equalization failure by the battery gauge before completion of the equalization.

In one embodiment, when the microprocessor controls the battery gauge to perform battery equalization, the microprocessor determines whether the pressure difference between cells of the battery is less than the pressure difference threshold. When the pressure difference is less than the pressure difference threshold, it indicates that the pressure difference between the cells of the battery is kept in an expected range. In this case, the microcontroller controls the battery gauge to stop equalizing the battery.

It may be understood that, in other embodiments, the microcontroller 2 calculates a difference value between the pressure difference and the pressure difference threshold in an initial stage of battery equalization by the battery gauge 1. The microcontroller 2 may automatically control, at an end of the battery equalization, the battery gauge 1 to stop equalizing the battery, so that it is not necessary to determine, during the battery equalization, whether the pressure difference is less than the pressure difference threshold. For example, when the microcontroller 2 calculates, in an initial stage of control of battery equalization by the battery gauge 1, the difference value between the pressure difference and the pressure difference threshold is 0.5 V, after a cell with a relatively high voltage in the battery consumes 0.5 V power (that is, battery equalization is completed), the microcontroller 2 automatically controls the battery gauge 1 to stop equalizing the battery.

Further, during battery equalization, the microcontroller determines, according to the battery level information of the battery, whether the remaining battery level of the battery is less than or equal to a second equalization threshold. When the remaining battery level of the battery is less than or equal to the second equalization threshold, the microcontroller controls the battery gauge 1 to stop equalization. The second equalization threshold is greater than a minimum limit value for the equalizing circuit of the battery gauge to work. When the remaining battery level of the battery is less than or equal to the second equalization threshold, the equalizing circuit cannot continue equalizing the battery due to a very low battery level.

In a practical application, the first equalization threshold is used for limiting a minimum value that the remaining battery level of the battery is required to reach before battery equalization. The second equalization threshold is mainly set according to a limit of a hardware circuit. In other words, the second equalization threshold is used for limiting a minimum value that the remaining battery level of the battery is allowed to reach during battery equalization. In addition, the second equalization threshold is less than the first equalization threshold. For example, if the second equalization threshold is set to 70% of the remaining battery level of the battery, and the first equalization threshold is set to 60% of the remaining battery level of the battery, the battery gauge stops equalizing when the remaining battery level of the battery reaches 70%. In this case, the first equalization threshold is still not reached, so that an equalization failure is caused all the time. Therefore, if the second equalization threshold is set to 70% of the remaining battery level of the battery, the first equalization threshold is higher than 70%, for example, 80%, so as to prevent the equalization failure all the time. Generally, an allowable limit of the hardware circuit is about 60% of the remaining battery level of the battery. In order to prevent a limit value of the hardware circuit, the second equalization threshold is generally set to be greater than 60%.

In one of the embodiments, the battery equalizing method may be applied to the battery equalizing apparatus in the Embodiment 1. Constituent parts and functions of the battery equalizing apparatus are specifically described in the Embodiment 1, and details thereof are not described herein again.

Embodiment 3

An embodiment of the present invention further provides an unmanned aerial vehicle. A battery providing electric power is disposed in the unmanned aerial vehicle. The battery may be equalized in the battery equalizing method in the Embodiment 2.

In one of the embodiments, the battery equalizing apparatus in the Embodiment 1 is further disposed in the unmanned aerial vehicle. The battery equalizing apparatus mainly includes: a battery gauge 1 and a microprocessor 2. Functions of the battery gauge 1 and the microprocessor 2 are described in detail in the Embodiment 1, and details thereof are not described herein again.

For the unmanned aerial vehicle according to the embodiment of the present invention, an internally integrated equalization function of the battery gauge 1 may be used to equalize the battery in a static state to save a space of a circuit board, facilitating miniaturization of the battery. In addition, battery equalization may be implemented without an increase in a volume of the battery.

Embodiment 4

An embodiment of the present invention further provides a non-transitory computer storage medium storing a computer-executable instruction that may perform the battery equalizing method in any of the foregoing method embodiments. The storage medium may be a magnetic disk, an optical disk, a read-only memory (ROM), a random access memory (RAM), a flash memory, a hard disk drive (HDD) or a solid state drive (SSD), etc. The storage medium may further include a combination of the memories.

Embodiment 5

Figure 5:
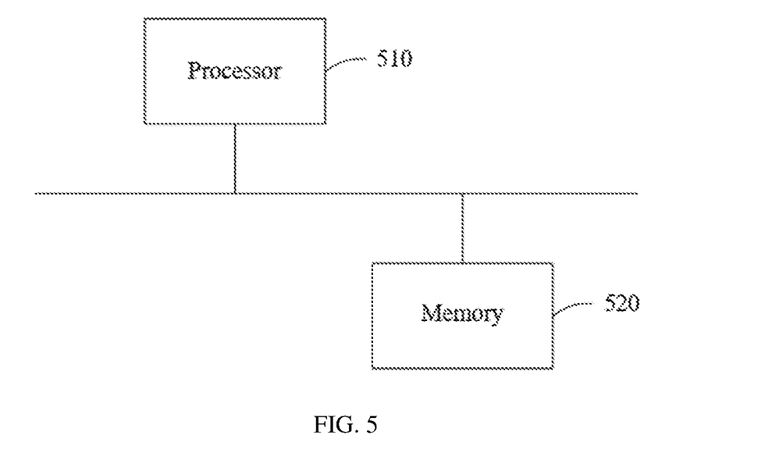
FIG. 5 is a schematic diagram of a hardware structure of a battery equalizing terminal device.

An embodiment of the present invention further provides a battery equalizing terminal device. FIG. 5 is a schematic diagram of a hardware structure of a battery equalizing terminal device according to an embodiment of the present invention. In FIG. 5, the device includes one or more processors 510 and a memory 520, and one processor 510 is used as an example in FIG. 5.

The processor 510 and the memory 520 may be connected through a bus or in other manners. In FIG. 5, for example, the processor and the memory are connected through a bus.

The processor 510 may be a central processing unit (CPU). The processor 510 may also be other general-purpose processors, digital signal processors (DSPs), application specific integrated circuits (ASICs), field-programmable gate arrays (FPGAs), or other programmable logic devices, discrete gates or transistor logic devices, discrete hardware components and other chips, or a combination of the foregoing chips. The general-purpose processor may be a microprocessor, or the processor may be any conventional processor or the like.

The memory 520, as a non-transitory computer-readable storage medium, may be configured to store a non-transitory software program, a non-transitory computer executable program and a module, such as a program instruction/module corresponding to the battery equalizing method in the embodiment of the present application. The processor 510 performs various functional applications and data processing of a server by running the non-transitory software program, instruction and module stored in the memory 520, that is, implementing the battery equalizing method described in the foregoing method embodiments.

The memory 520 may include a program storage area and a data storage area. The program storage area may store an operating system and an application program that is required for at least one function. The storage data area may store data and the like created according to use of the battery equalizing apparatus. In addition, the memory 520 may include a high-speed random access memory, and may further include a non-transitory memory, such as at least one magnetic disk memory device, a flash memory device or other non-transitory solid-state memory devices. In some embodiments, the memory 520 may optionally include memories remotely disposed relative to the processor 510, these remote memories being connected to the battery equalizing apparatus through a network. An example of the network includes, but is not limited to, the Internet, an intranet, a local area network, a mobile communications network and a combination thereof.

The one or more modules are stored in the memory 520, when the one or more modules are performed by the one or more processors 510, the method shown in FIG. 4 being performed.

For the foregoing product, the method provided in the embodiments of the present application may be performed, and the corresponding functional modules for performing the method and beneficial effects thereof are provided. For technical details not described in detail in this embodiment, reference may be made to a relevant description in the embodiments shown in FIG. 1 to FIG. 4.

Apparently, the foregoing embodiments are merely examples provided for clarity of description, and are not intended to limit the implementation of the present invention. One of ordinary skill in the art may also make changes or variations in other different forms based on the foregoing descriptions. It is unnecessary and impossible to list all implementations herein. Any obvious change or variation that can be conceived of based on the foregoing descriptions shall fall within the protection scope of the present invention.

What is claimed is:

1. A battery equalizing apparatus, comprising:
a battery gauge configured to monitor battery level information of a battery in a static state, a battery equalizing circuit being disposed inside the battery gauge; and
a microprocessor connected to a communication port of the battery gauge and configured to: acquire the battery level information monitored by the battery gauge, and calculate a pressure difference between cells of the battery in a static state according to the battery level information, and determine whether the pressure difference is greater than a pressure difference threshold;
the microprocessor sending a trigger signal to the battery gauge through the communication port when the pressure difference is greater than the pressure difference threshold, to trigger the equalizing circuit of the battery gauge to equalize the battery;
wherein the microprocessor is further configured to determine, according to the battery level information of the battery, whether a remaining battery level of the battery is less than or equal to a first equalization threshold;
the microprocessor controlling, when the remaining battery level of the battery is less than or equal to the first equalization threshold, the battery gauge to skip equalizing the battery;
wherein the microprocessor is further configured to determine, according to the battery level information of the battery during battery equalization, whether the remaining battery level of the battery is less than or equal to a second equalization threshold;
the microprocessor controlling, when the remaining battery level of the battery is less than or equal to the second equalization threshold, the battery gauge to stop equalizing the battery; wherein
the second equalization threshold is less than or equal to the first equalization threshold.

2. The battery equalizing apparatus according to claim 1, wherein the communication port of the battery gauge is set to a high level after the battery gauge receives the trigger signal, so that the equalizing circuit of the battery gauge equalizes the battery.

3. The battery equalizing apparatus according to claim 1, wherein the microprocessor is further configured to determine, during battery equalization, whether the pressure difference is less than the pressure difference threshold;
the microprocessor controlling, when the pressure difference is less than the pressure difference threshold, the battery gauge to stop equalizing the battery.

4. The battery equalizing apparatus according to claim 1, wherein the first equalization threshold is 80% of the remaining battery level of the battery, and the second equalization threshold is 70% of the remaining battery level of the battery.

5. The battery equalizing apparatus according to claim 1, wherein the battery equalizing circuit comprises: a switch element, wherein
an input of the switch element is connected to a positive electrode of the battery; and an output of the switch element is connected to a negative electrode of the battery, and a control terminal of the switch element is connected to the microprocessor.

6. The battery equalizing apparatus according to claim 5, wherein the battery equalizing circuit further comprises: a resistor and a capacitor, wherein
the resistor is connected between the positive electrode of the battery and the input of the switch element; and
one end of the capacitor is connected between the resistor and the input of the switch element, and the other end is grounded.

7. A battery equalizing method, wherein the method is applied to the battery equalizing apparatus which comprises:
a battery gauge configured to monitor battery level information of a battery in a static state, a battery equalizing circuit being disposed inside the battery gauge; and
a microprocessor connected to a communication port of the battery gauge and configured to: acquire the battery level information monitored by the battery gauge, and calculate a pressure difference between cells of the battery in a static state according to the battery level information, and determine whether the pressure difference is greater than a pressure difference threshold;
the microprocessor sending a trigger signal to the battery gauge through the communication port when the pressure difference is greater than the pressure difference threshold, to trigger the equalizing circuit of the battery gauge to equalize the battery and comprises:
acquiring battery level information of the battery in a static state, calculating a pressure difference between the cells of the battery in a static state according to the battery level information, and determining whether the pressure difference is greater than the pressure difference threshold; and
sending a trigger signal to the battery gauge through the communication port when the pressure difference is greater than the pressure difference threshold, to trigger the battery gauge to equalize the battery;
determining, according to the battery level information of the battery, whether a remaining battery level of the battery is less than or equal to a first equalization threshold; and
controlling, when the remaining battery level of the battery is less than or equal to the first equalization threshold, the battery gauge to skip equalizing the battery,
determining, according to the battery level information of the battery during battery equalization, whether the remaining battery level of the battery is less than or equal to a second equalization threshold; and
controlling, when the remaining battery level of the battery is less than or equal to the second equalization threshold, the battery gauge to stop equalizing the battery; wherein
the second equalization threshold is less than or equal to the first equalization threshold.

8. The battery equalizing method according to claim 7, wherein the communication port of the battery gauge is set to a high level after the battery gauge receives the trigger signal, so that the equalizing circuit of the battery gauge equalizes the battery.

9. The battery equalizing method according to claim 7, further comprising:
determining, during battery equalization, whether the pressure difference is less than the pressure difference threshold; and
controlling, when the pressure difference is less than the pressure difference threshold, the battery gauge to stop equalizing the battery.

10. The battery equalizing method according to claim 7, before the acquiring battery level information of the battery in a static state, further comprising:
enabling a static equalization function of the battery gauge.

11. The battery equalizing method according to claim 1, wherein the first equalization threshold is 80% of the remaining battery level of the battery, and the second equalization threshold is 70% of the remaining battery level of the battery.

12. An unmanned aerial vehicle (UAV), comprising a battery, wherein the battery is equalized by adopting the battery equalizing method which comprises:
acquiring battery level information of the battery in a static state, calculating a pressure difference between the cells of the battery in a static state according to the battery level information, and determining whether the pressure difference is greater than the pressure difference threshold; and
sending a trigger signal to the battery gauge through the communication port when the pressure difference is greater than the pressure difference threshold, to trigger the battery gauge to equalize the battery;
determining, according to the battery level information of the battery, whether a remaining battery level of the battery is less than or equal to a first equalization threshold; and
controlling, when the remaining battery level of the battery is less than or equal to the first equalization threshold, the battery gauge to skip equalizing the battery,
determining, according to the battery level information of the battery during battery equalization, whether the remaining battery level of the battery is less than or equal to a second equalization threshold; and
controlling, when the remaining battery level of the battery is less than or equal to the second equalization threshold, the battery gauge to stop equalizing the battery; wherein
the second equalization threshold is less than or equal to the first equalization threshold.

* * * * *